(12) United States Patent
Suga

(10) Patent No.: US 6,433,910 B2
(45) Date of Patent: Aug. 13, 2002

(54) CONFOCAL OPTICAL SYSTEM

(75) Inventor: Takeshi Suga, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/840,177

(22) Filed: Apr. 24, 2001

(30) Foreign Application Priority Data

Apr. 28, 2000 (JP) ........................................ 2000-128723

(51) Int. Cl.$^7$ .............................................. G02B 26/08
(52) U.S. Cl. ...................... 359/212; 359/223; 359/368; 359/389; 600/170
(58) Field of Search ................................ 359/223, 224, 359/232, 234, 368, 385, 389; 600/170, 182

(56) References Cited

U.S. PATENT DOCUMENTS

| | | | |
|---|---|---|---|
| 5,120,953 A | | 6/1992 | Harris |
| 5,306,902 A | * | 4/1994 | Goodman ................ 250/201.3 |
| 5,742,419 A | | 4/1998 | Dickensheets et al. |
| 5,907,425 A | * | 5/1999 | Dickensheets et al. ...... 359/224 |
| 6,057,952 A | | 5/2000 | Kubo et al. |
| 2001/0043383 A1 | | 11/2001 | Suga |

FOREIGN PATENT DOCUMENTS

| | | |
|---|---|---|
| JP | 3-87804 | 4/1991 |
| JP | 9-230248 | 9/1997 |

\* cited by examiner

*Primary Examiner*—Mark A. Robinson
(74) *Attorney, Agent, or Firm*—Arnold International; Bruce Y. Arnold

(57) ABSTRACT

A confocal optical system includes a pinhole aperture for creating a point light source from light that is transmitted through an optical fiber, an optical scanning system for scanning the light that emerges from the pinhole aperture, and an optical focusing system. The optical focusing system focuses light from the pinhole aperture via the optical scanning system onto or within an object such that the pinhole aperture and the focused light region at the object are at conjugate positions of the confocal optical system. Thus, light reflected by the object is returned to the optical fiber via the pinhole aperture. At least one of the optical scanning system and the optical focusing system includes a reflective surface region and a region that has a different reflectivity than the reflective surface region. The region that has a different reflectivity may be an aperture, a region of lower reflectance factor, or even a region that reflects light well, but in a direction which prevents light which does not illuminate the object via the optical scanning system from being returned to the optical fiber core region. Thus, the purpose of the region having a different reflectivity is to reduce optical noise that is returned to the optical fiber.

22 Claims, 8 Drawing Sheets lens optical axis direction

CONFOCAL OPTICAL SYSTEM

BACKGROUND OF THE INVENTION

A miniature confocal optical system that is used along the channel of an endoscope is described in Japanese Laid Open Patent Applications H9-230248 and H3-87804. A prior art schematic diagram showing the principle components used with a confocal optical system that may be inserted in a channel of an endoscope for viewing an object of interest is shown in FIG. 8.

Referring to FIG. 8, light from a light source 51 enters a four-terminal optical coupler 52, which leads the light to a miniature confocal optical system 54. The miniature confocal optical system 54 focuses the light onto an object. Light reflected by the object is detected at an optical detection unit 53 after it has been propagated through the miniature confocal optical system 54 and the four-terminal optical coupler 52. The detected light is processed at a processing unit 55 in order to image the object The miniature confocal optical system 54 is inserted in a channel of an endoscope in order to observe and diagnose cells inside a human body. As is shown in FIG. 9, the miniature confocal optical system 54 is of the side-view type, in which the viewing direction is orthogonal to the direction of insertion of the miniature confocal optical system 54.

Conventional endoscopes are generally of the straight-view type, in which the viewing direction is aligned with the direction of insertion of the endoscope. When a side-view type miniature confocal optical system is inserted in the channel of a straight-view type endoscope, inconsistency in the viewing directions of the endoscope's objective lens versus the miniature confocal optical system may give rise to a problem in that the observation range of the miniature confocal optical system cannot be determined by viewing through the objective lens of the endoscope.

To solve this problem, a straight-view type miniature confocal optical system may be used, as shown in FIG. 7, with a straight-view type endoscope. This facilitates determining the location and range of observation of the miniature confocal optical system by viewing through the objective lens of the endoscope. Thus, locating the view of the miniature confocal optical system on an object of interest is facilitated. Therefore, a straight-view type, miniature confocal optical system is more easily used with a straight-view type endoscope.

Objects inside a human body, particularly cells, reflect light rather poorly. Thus, the optical signals of interest tend to be very weak. On the other hand optical noise (i.e., light which reflects on a lens or other surface within the optical system and directly returns to the optical fiber without reaching the object), is rather strong as compared to the optical signals of interest. Therefore, it is critical to suppress the optical noise as much as possible.

BRIEF SUMMARY OF THE INVENTION

The present invention relates to a confocal optical system, especially to a miniature confocal optical system that may be used along the channel of an endoscope. A first object of the present invention is to provide a miniature confocal optical system which enables the observation of poorly reflective objects with a high signal-to-noise ratio S/N. A second object of the invention is to provide a miniature confocal optical system of the straight-view type having a high S/N which can be inserted into the channel of an endoscope.

BRIEF DESCRIPTION OF THE DRAWINGS

The present invention will become more filly understood from the detailed description given below and the accompanying drawings, which are given by way of illustration only and thus are not limitative of the present invention, wherein.

DETAILED DESCRIPTION

Several embodiments of the present invention will be described with reference to the drawings.

Embodiment 1

Figure 1:
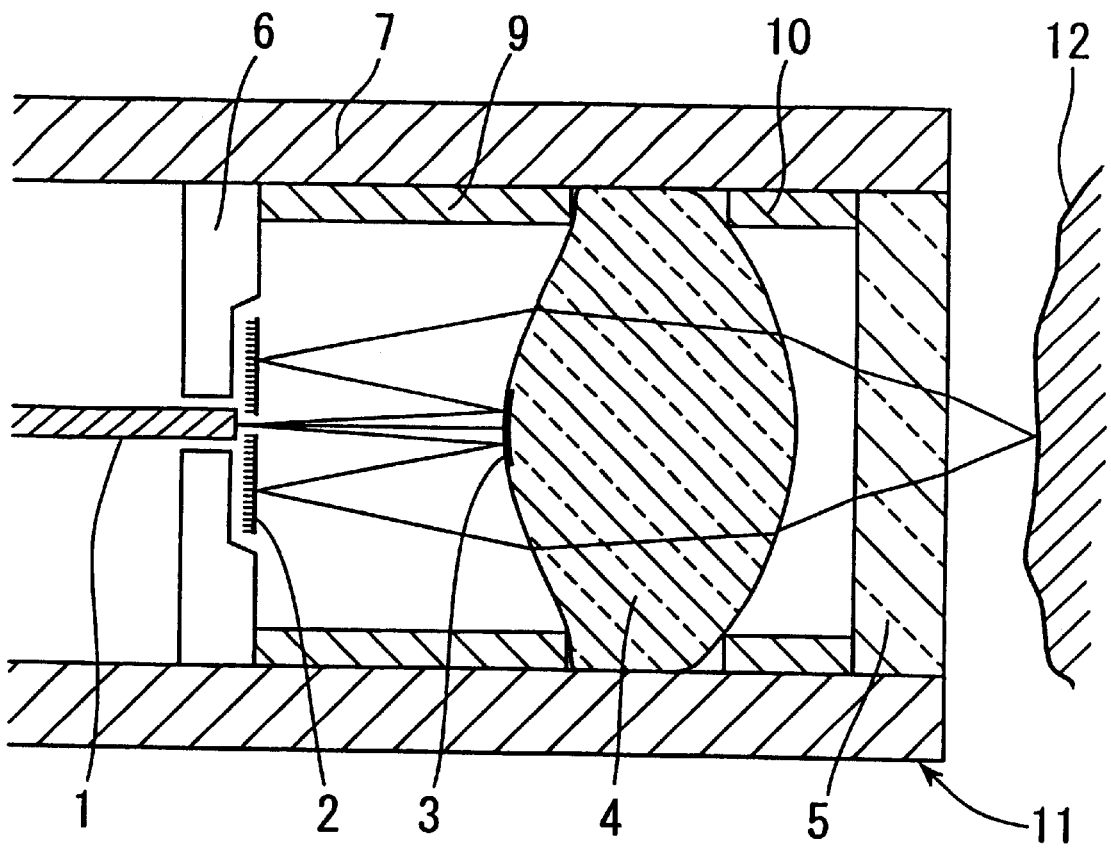
FIG. 1 shows the structure of Embodiment 1 of the present invention.
Figure 8:
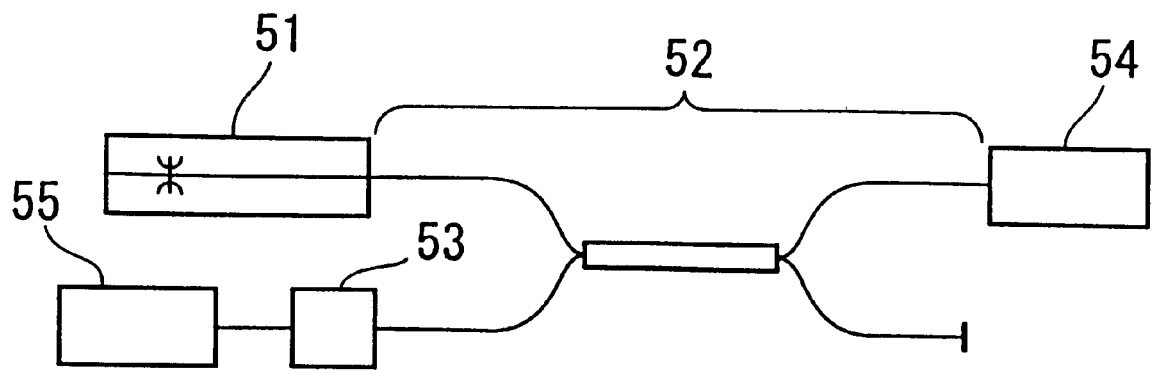
FIG. 8 is a prior art schematic diagram showing the principle components used with a prior art confocal optical system that may be inserted in a channel of an endoscope for viewing an object of interest.
Figure 9:
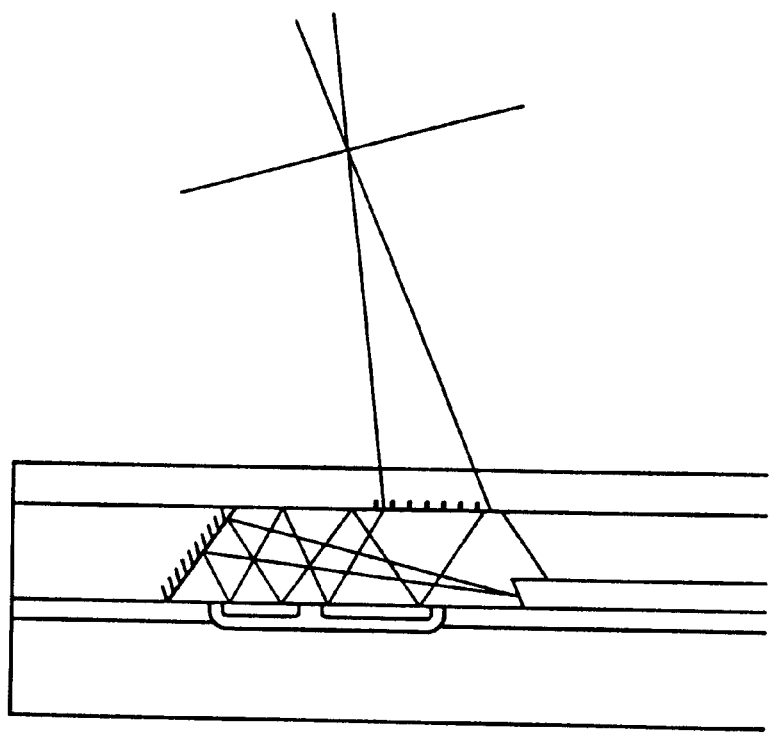
FIG. 9 illustrates a prior art, side-view type, miniature confocal optical system that may be inserted in a channel of an endoscope for viewing an object of interest.

Embodiment 1 of the miniature confocal optical system according to the present invention is shown in FIG. 1. A light beam, such as a laser beam, is emitted from alight source 51 (see FIG. 8) and transits an optical fiber 1 after passing through a four-terminal optical coupler 52 (FIG. 8). Upon exiting the optical fiber 1, the light passes through an aperture formed at the center of a scanning mirror 2 and is reflected by a mirror 3 having an outer reflective surface region and an inner region having a relatively lower reflectance factor. The region of mirror 3 of relatively lower reflectance factor is for reducing the amount of light (i.e., noise) that is returned directly to the optical fiber 1 by the mirror 3 without having been reflected from an object surface of interest 12. The reflective surface region of mirror 3 reflects the light from optical fiber 1 to scanning mirror 2. The scanning mirror 2 then, reflects the light onto a peripheral portion of the lens 4, so that the light is converged onto an object surface 12 via a cover glass 5. Light reflected by the object surface 12 retraces the same path, but in the reverse direction, so as to be returned to the optical fiber 1. This light is then guided to an optical detection unit 53 (FIG. 8). The scanning mirror 2 is manufactured using micro-machining technology. For instance, it may be formed of a movable micro-mirror. This micro-machined mirror may be supported with gimbals and may be driven, for example, electostatically, so as to achieve a two-dimensional scan. Thus, the object surface 12 may be imaged so as to obtain two-dimensional images. The scanning mirror 2 has a reflective surface of outer diameter 460 $\mu$m with an aperture diameter of 80 $\mu$m at its center.

Figure 2:
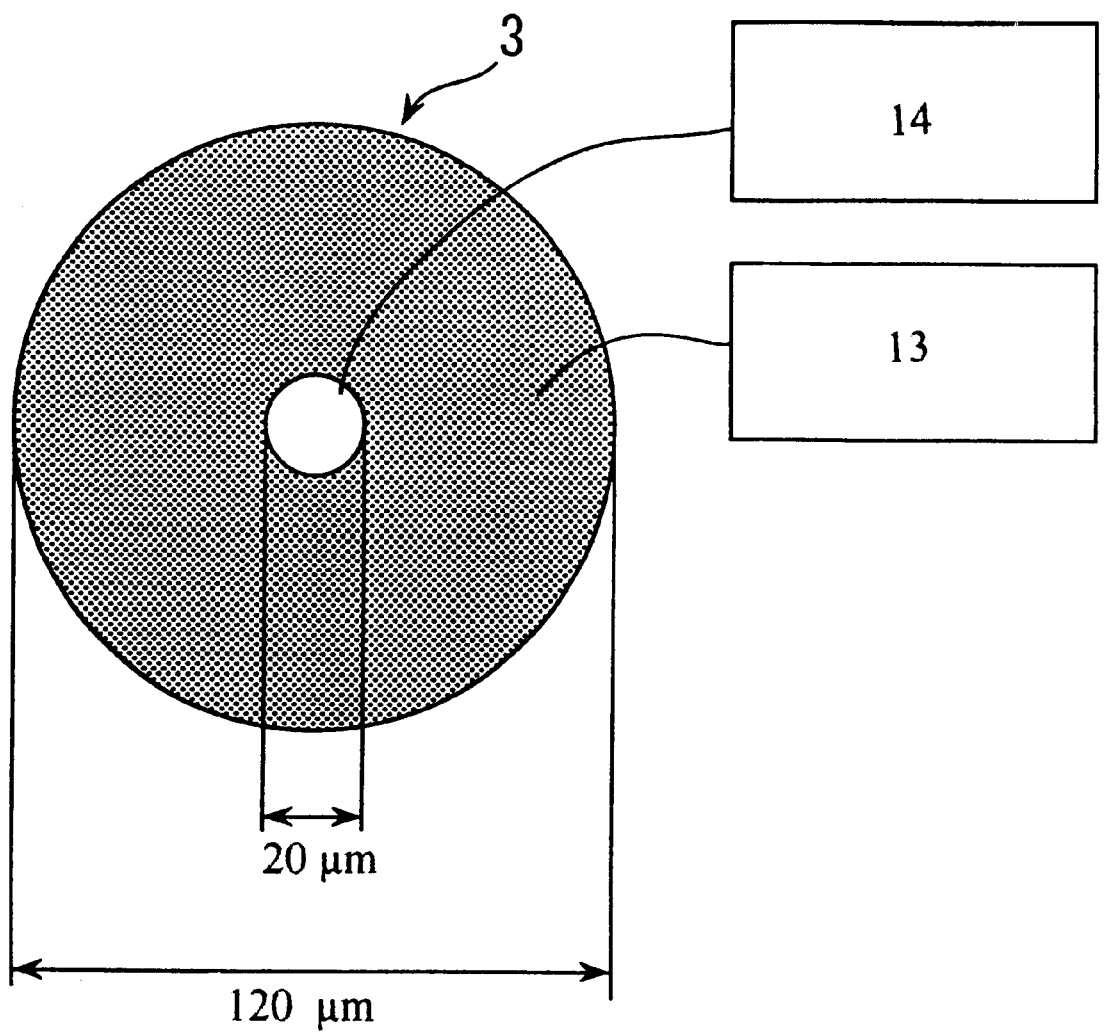
FIG. 2 shows, in greater detail, the structure of the mirror 3 illustrated in FIG. 1.

In this optical system the optical core portion at the end face of the optical fiber 1 serves as a pinhole aperture of the confocal optical system. Because a confocal optical system is utilized, the optical fiber 1 can be either a single mode optical fiber or a multi-mode optical fiber. In Embodiment 1, mirror 3 is designed for reducing optical noise. As shown in FIG. 2, the mirror 3 may have, for example, a reflective surface region 13 (of 120 μm diameter) and a region 14 (of 20 μm diameter) of relatively lower reflectance factor positioned at its center. The relatively lower reflectance factor region 14 allows optical noise to be reduced by reducing the amount of light which is directly returned to the optical fiber 1 as a result of being reflected by the center portion of mirror 3.

Light reflected on the mirror 3 spans an area on scanning mirror 2 centered about the end face of optical fiber 1, and this area has a diameter of about 490 μm. Assuming the reflectance factor of the region 14 of mirror 3 is "A" and the core portion diameter of the optical fiber 1 is 8 μm the attenuation of optical noise (i.e., the proportion of light that is reflected by the mirror 3 directly back into the fiber core portion) is given by: A×(8 μm/490 μm)$^2$=2.6×A×10$^{-4}$. The reflectance of live cells is approximately 10$^{-4}$. Thus, if the reflectance factor of the region 14 is less than about 40% (i.e., 1/2.6), the optical signal will be stronger than the optical noise.

The mirror 3 is manufactured by depositing a layer of aluminium followed by removal of the deposited aluminum in a center region thereof using laser processing. In this way, the center part of the mirror 3 near the optical axis, having a diameter of about 20 μm, has its reflectance factor A reduced to approximately 10%. Furthermore, an antireflection coating can be used to reduce the reflectance factor of the center part of the mirror 3 to less than 1%. On the other hand, the peripheral region (i.e., the region retaining the 10$^{-4}$ μm thick aluminum layer) has a reflectance factor of approximately 90%.

The mirror 3 can also be manufactured by depositing an aluminum layer within an area of about 120 μm diameter, as above, followed by the deposition of a low reflectance factor material, such as chromium oxide, at the center thereof. Alternatively, the mirror 3 can also be manufactured by depositing an aluminum layer within an area of about 120 μm diameter, as above, followed by deposition of an anti-reflection coating at the center thereof.

The optical system of Embodiment 1 has the following construction and dimensions:

the distance between the end of the optical fiber 1 and the scanning mirror 2 is 0.07 mm;

the distance between the scanning mirror 2 and the lens 4 is 0.855 mm;

the center thickness of the lens 4 is 0.979 mm;

the distance between the lens 4 and the cover glass 5 is 0.2 mm;

the thickness of the cover glass is 0.3 mm;

the cover glass is made of BK7 glass;

the lens 4 has a refractive index of 1.81 at the wavelength of the sodium d-line (i.e., 587.56 nm);

the Abbe number of the material of the lens 4 is 37.03; and the outer diameter of lens 4 is 1.6 mm.

Both surfaces of the lens 4 are aspherical in shape. Assuming the optical axis direction is in the Z direction, the equation of the aspherical surfaces (i.e., the Z coordinate at each point (X, Y) on the surface) is expressed by Equation (A) below:

$$Z=(S^2/R)/(1+(1-(K+1)S^2/R^2)^{1/2})+AS^4+BS^6+CS^8+DS^{10} \quad \text{Equation (A)}$$

where

R equals the radius of curvature of the surface near the optical axis,

S$^2$ equals X$^2$+Y$^2$.

K is the conic constant, and

A, B, C and D are the even order coefficients of S in Equation (A), as indicated.

The first surface of lens 4 (i.e., the surface nearest the scanning mirror 2) has the following parameters for Equation (A):

R=0.83878 K=0.000000 A=−0.429914 B=−0.137634 C=0.59999×10$^{-1}$

D=−0.140953×10$^1$.

The second surface of lens 4 (i.e., the surface nearest the cover glass 5) has the following parameters for Equation (A):

R=−0.88856 K=0.000000 A=0.869421 B=−0.137634× 10$^1$ C=0.15372×10$^1$

D=−0.644973.

The optical fiber 1, scanning mirror 2, lens 4, and cover glass 5 form a miniature confocal optical system 11 which may be contained in a microscope body 7 and inserted into a channel of an endoscope.

FIG. 1 also shows a mirror support 6 for supporting the scanning mirror 2, as well as a spacing ring 9 for setting the distance between the mirror 2 and the lens 4, and a spacing ring 10 for setting the distance between the lens 4 and the cover glass 5.

Embodiment 1 has a straight-view structure in which the lengthwise direction of the miniature confocal optical system 11 is consistent with the viewing direction. A probe which can be inserted in the channel of an endoscope has an outer diameter of approximately 2–3 mm. Therefore, it is preferred that the lengthwise directions of the probe and the optical fiber are consistent. This embodiment can easily realize a straight-view structure due to the fact that the lengthwise direction of the optical fiber and the optical axis of the lens 4 are coaxial. In addition, the optical path is folded, which helps to shorten the length of the entire optical system as well as the non-flexible, leading part of the structure. As is described above, Embodiment 1 uses the lower reflectance factor region 14 at the center of the mirror 3 to reduce optical noise. Compared to a conventional means in which a shading member such as an aperture ring is inserted within the optical system to reduce optical noise, (as shown, for example, in Japanese Patent No. 2915919) Embodiment 1 employs fewer components. Therefore, this facilitates the assembling of the optical system.

Because Embodiment 1 has a folded optical path between the optical fiber 1 and the lens 4, the light beam is propagated in a complicated manner. Therefore, if a shading member such as an aperture ring is inserted on the optical axis, a member for supporting the shading member, and the like, may cause the light to be eclipsed, reflected or scattered, leading to a deterioration in optical performance. Embodiment 1 uses the lower reflectance factor region 14 directly positioned on the mirror 3 to avoid this problem. The size of the lower reflectance factor region 14 may be varied. The lower reflectance factor region 14 can be smaller than a region having a diameter 20 μm as long as the optical fiber 1 and lens 4 can be positioned with high precision. It is preferred that the lower reflectance factor region 14 be larger, such as a region of diameter of 40 μm, when the positioning precision is poor. It is further preferred that the lower reflectance factor region 14 be no more than about one-third the diameter of the reflective surface region, that is to say, no more than about 40 μm in diameter in tie case where the reflective surface region is 120 μm in diameter.

The location of the "lower reflectance factor" region may also be varied. Embodiment 1 has the lower reflectance factor region 14 on the optical axis of the lens 4 (i.e., at the center of the reflective surface region 13) because the optical axes of the optical fiber 1 and of the lens 4 are coaxial. However, if these optical axes are not coaxial, it is preferred that the lower reflectance factor region 14 be de-centered with respect to the optical axis of the lens 4.

Furthermore, rather than the regions 13 and 14 of mirror 3 differing in reflectance factor, these regions may instead have different surface profiles. Thus, a region of mirror 3 that returns light directly to the optical fiber (i.e., without the light having been incident on an object surface) may be modified in some manner other than having its reflectance factor reduced. For example, the two different regions 13 and 14 may reflect light in different directions so as to achieve a similar result (namely, reducing the amount of light that is returned to the optical fiber without having been reflected by an object surface of interest). Thus, if the region 14 is made to have a reflective surface profile which is oblique in relation to the optical axis of the lens 4, light, reflected by the region 14 will not be returned to the optical fiber 1. The surface profile of the region 14 should be determined when the lens 4 is formed so that optical noise can be reduced even if the regions 14 and 13 have a similar reflectance factor.

Figure 6A:
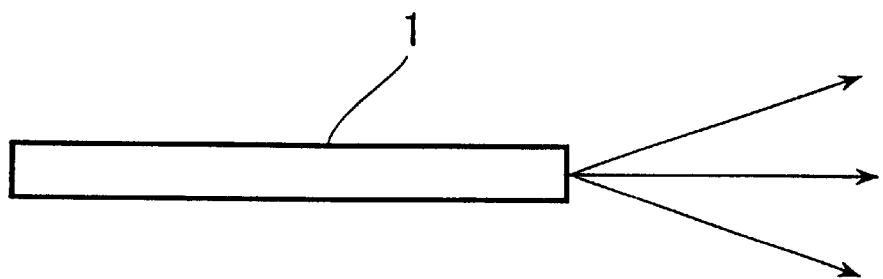
FIGS. 6A–6C shows various structures of optical fiber 1 which may be used in the embodiments of the present invention.
Figure 6B:
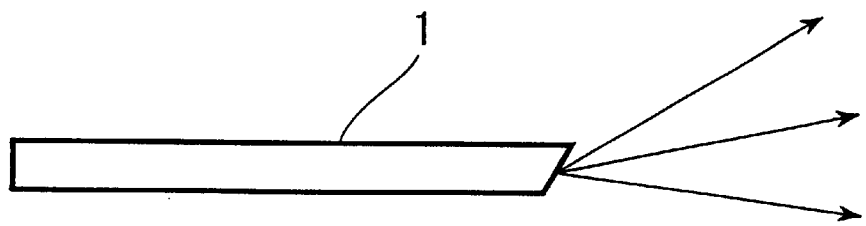

As shown in FIG. 6A, the optical fiber 1 may have an orthogonally-cut end face as in Embodiment 1. Alternatively, the end face may be obliquely cut, as is shown in FIG. 6B. By cutting the optical fiber obliquely, light reflects on the optical fiber end face at an angle larger than the numerical aperture of the optical fiber so that the light no longer travels within the optical fiber. Therefore, optical noise may be further reduced. However, cutting the optical fiber end obliquely causes the light which emerges from the optical fiber to no longer be parallel with the lengthwise direction of the optical fiber at its end, as is shown FIG. 6B. In this case, arranging the optical fiber obliquely as is shown FIG. 6C allows light which emerges from the optical fiber to be aligned with the optical axis of the lens 4. This allows light that emerges from the optical fiber to effectively fall on the object 12, thereby increasing the optical signal from the object. The light source 51 (see FIG. 8) is, preferably, a low coherence light source such as semiconductor laser or super luminescent diode. If optical noise cannot be reduced sufficiently, the optical noise and the optical signal reflected from the surface of the object interfere with each other. Using a low coherent light source for the light source 51 reduces such interference. This enables signals having a higher signal/noise ratio to be obtained from the object using the optical detection unit 53 (FIG. 8).

Embodiment 2

Figure 3:
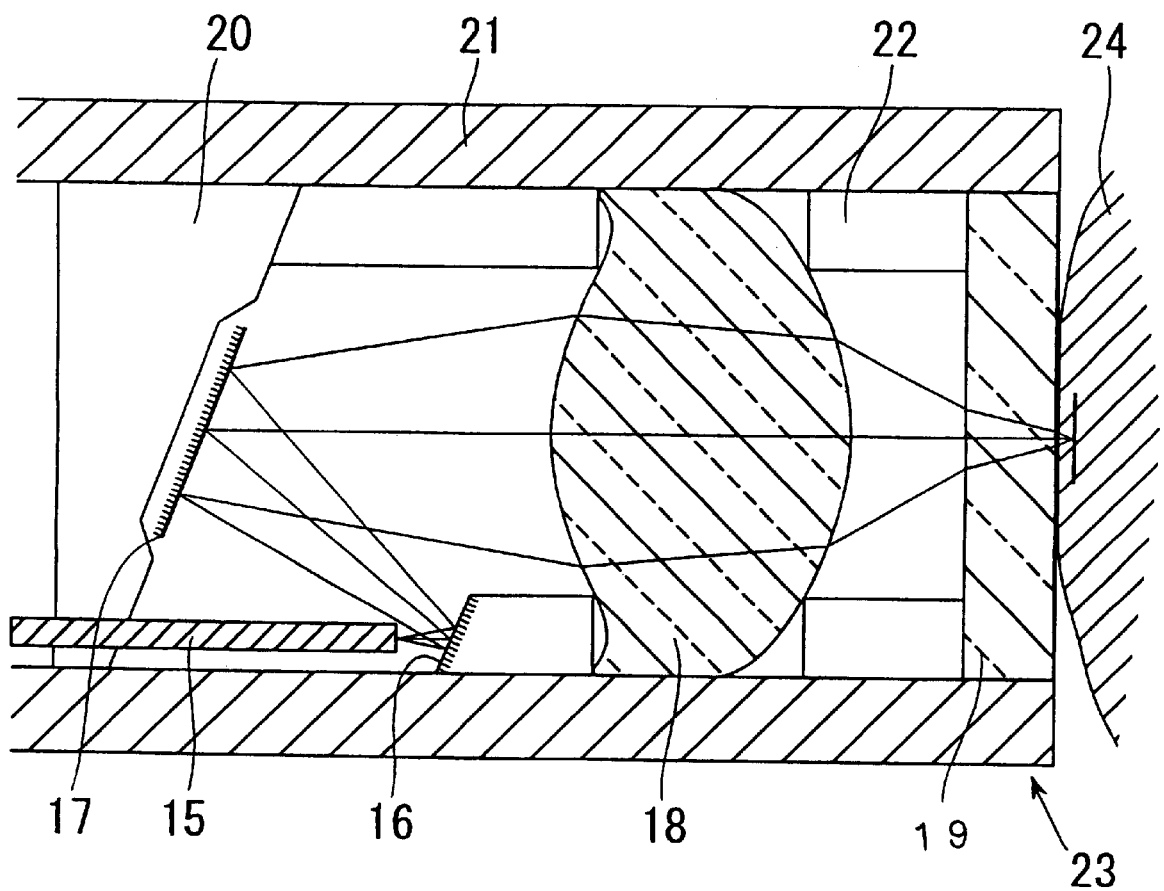
FIG. 3 shows the structure of Embodiment 2 of the present invention.

The structure of Embodiment 2 of the present invention is shown in FIG. 3. Light that emerges from an optical fiber 15 is reflected by a fixed mirror 16 and directed to a scanning mirror 17. Light reflected from the scanning mirror 17 is then converged by a lens 18, transmitted through a cover glass 19, and is brought to a focus at a certain depth within the object 24. Light reflected at the certain depth of the object 24 then retraces its previous path, but in the reverse direction, returning to the optical fiber 15.

The scanning mirror 17 is similar to the scanning mirror 2 in Embodiment 1, and is formed of a gimbaled mirror that is manufactured using micro-machining technology. The scanning mirror 17 enables the focus point of the light at the certain depth within the object 24 to be scanned two dimensionally. As a result, the reflected light that returns to the optical fiber 15 yields two-dimensional images. The end face of the core portion of the optical fiber 15 serves as a pinhole aperture in this optical system. Accordingly, this optical system is confocal.

Figure 4:
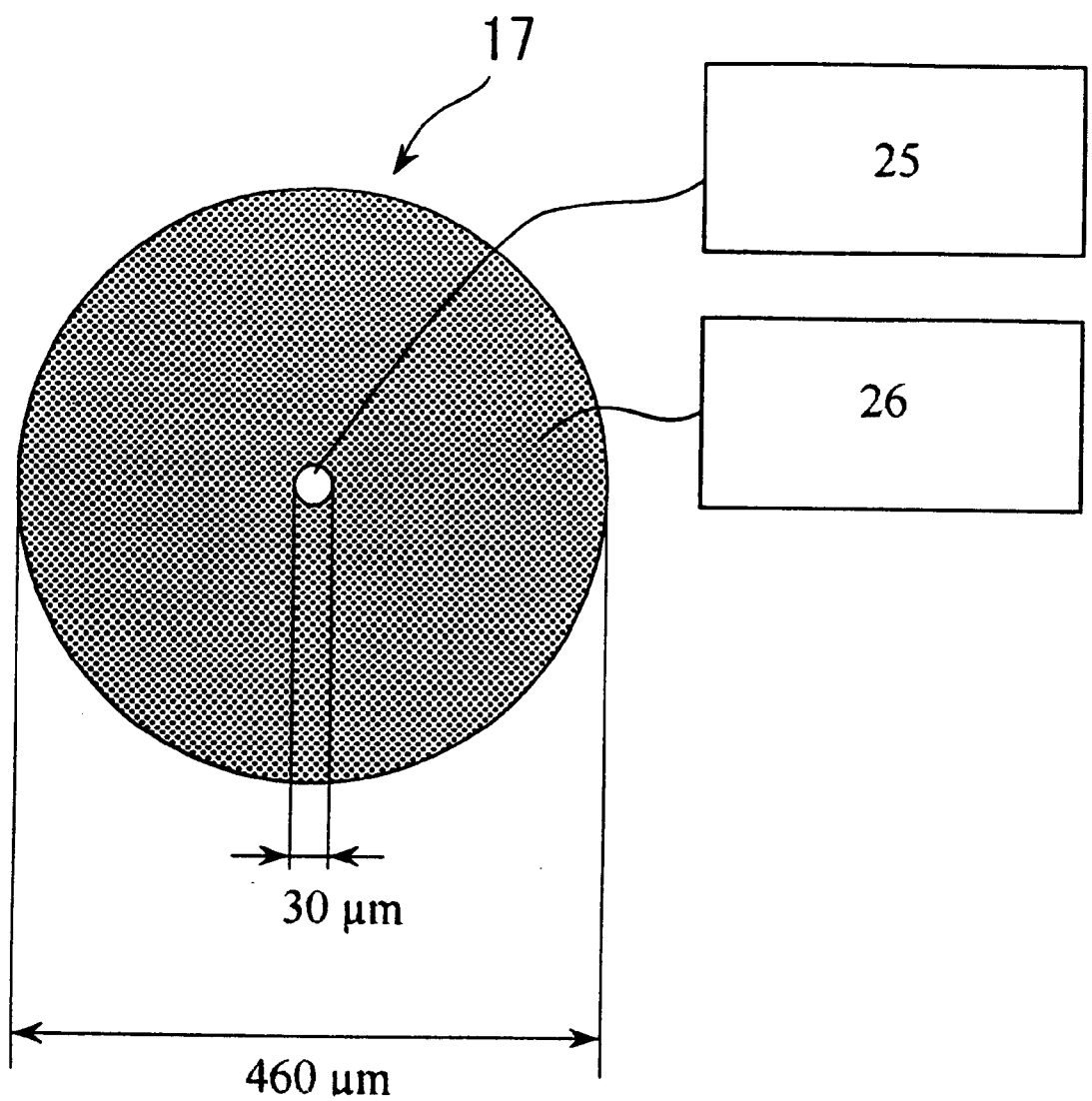
FIG. 4 shows, in greater detail, the structure of the scanning mirror 17 illustrated in FIG. 3.

As shown in FIG. 4, Embodiment 2 employs a scanning mirror 17 that is formed of a high reflectance factor region 26 (which may be formed, for instance, by aluminum deposition) and a low reflectance factor region 25. In this embodiment, the low reflectance factor region 25 has a reflectance factor of substantially zero, which is achieved by region 25 being an aperture. This can almost entirely eliminate optical noise that otherwise would arise due to light trays emerging from the optical fiber in-line, or nearly so, with the optical axis. This light would tend to be directly returned to the optical fiber 15 as a result of being reflected from one of the surfaces of the lens 18 or cover glass 19 back into the optical fiber core region.

The low reflectance region 25 can alternately, as in the previous embodiment be formed of a low reflectance factor material such as a deposited layer of chromium oxide, or it may be formed of an antireflection coating. In general, optical noise as described above can also be reduced by applying antireflection coatings to the lens 18 and the cover glass 19. However, it is difficult to apply an antireflection coating on the surface of the cover glass 19 that faces the object 24. The cover glass 19, when used with an endoscope that is inserted inside a human body for observation, normally is in contact with a body fluid or is pressed against some other substance. Thus, due to the refractive index possibly changing, depending on the particular use, it is difficult to design an appropriate antireflection coating for the cover glass 19. Without an antireflection coating, the object-side surface of the cover glass 19 may reflect as much as several percent of the incident light, and thus this surface can be responsible for causing noise.

Also, it is possible for an antireflection coating on the surface of the lens 18 and an antireflection coating on the surface of the cover glass 19 to themselves be a source of noise, resulting in a deterioration of performance. This will occur if the wavelength of the light source is changed, resulting in the wavelength of incident light being different from the design wavelength for the antireflection coatings. However, by making the low reflectance region 25 be an aperture, as in Embodiment 2, the optical noise is almost entirely eliminated even if the wavelength of incident light changes.

The optical system of Embodiment 2 has the following construction and dimensions:

the distance between the end of the optical fiber 15 and the lens 18 is 2.428 mm;

the center thickness of the lens 18 is 1.009 mm;

the distance between the lens 18 and the cover glass 19 is 0.4 mm;

the thickness of the cover glass 19 is 0.3 mm;

the cover glass 19 is made of BK7 glass;

the lens 18 has a refractive index of 1.81 at the wavelength of the sodium d-line (i.e., 587.56 nm);

the Abbe number of the material of the lens 18 is 37.03; and the outer diameter of lens 18 is 1.6 mm.

Both surfaces of lens 18 have an aspherical shape, with the equation of the asphere being given by Equation (A) above.

The first surface of lens 18 (i.e., the surface nearest the scanning mirror 17) has the following parameters for Equation (A):

R=0.86640 K=0.000000 A=−0.390053 B=−0.141334 C=−0.961103

D=−0.32909×10$^{-1}$

The second surface of lens 18 (ice., the surface facing the cover glass 19) has the following parameters for Equation (A):

R=−0.91840 K=0.000000 A=0.831111 B=−0.219902×10$^1$ C=0.387789×10$^1$ D=−0.267905×10$^1$.

The optical fiber 15, fixed mirror 16, scanning mirror 17, lens 18, and cover glass 19 form a miniature confocal optical system 23 contained in a microscope body 21 which can be inserted into a channel of an endoscope. FIG. 3 also shows a mirror support 20 for supporting the scanning mirror 17 and a spacing ring 22 for setting the distance between the lens 18 and the cover glass 19.

Embodiment 2, just as in Embodiment 1, employs a straight-view structure due to the fact that the lengthwise direction of the optical fiber 15 is parallel with the optical axis of the lens 18. And, as is described above, Embodiment 2 can substantially reduce optical noise arising from unwanted reflections occurring at the surfaces of the lens 18 and the cover glass 19.

Compared to a structure in which a shading member such as an aperture ring is inserted within the optical system to reduce optical noise elements, this embodiment uses a "low reflectance region" (in this case an aperture having substantially zero reflectance) on the scanning mirror to reduce optical noise, and requires fewer parts than in the prior art. Therefore, assembling the optical system of the present invention is facilitated as compared to assembling the optical systems of the prior art. Because Embodiment 2 has a folded optical path between the optical fiber 15 and the lens 18, light is propagated in a complicated manner. Therefore, if a shading member such as an aperture ring were to be inserted on the optical axis, a member for supporting the shading member, and the like, may cause the light to be eclipsed, reflected or scattering, leading to deterioration in optical performance. On the contrary, however, Embodiment 2 uses an aperture at the center part of the scanning mirror 17 as the "low reflectance region 25" to entirely avoid this problem.

Figure 6C:
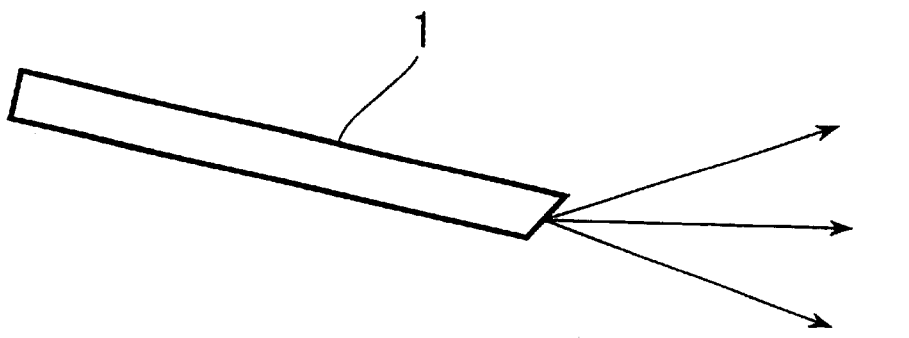
Figure 7:
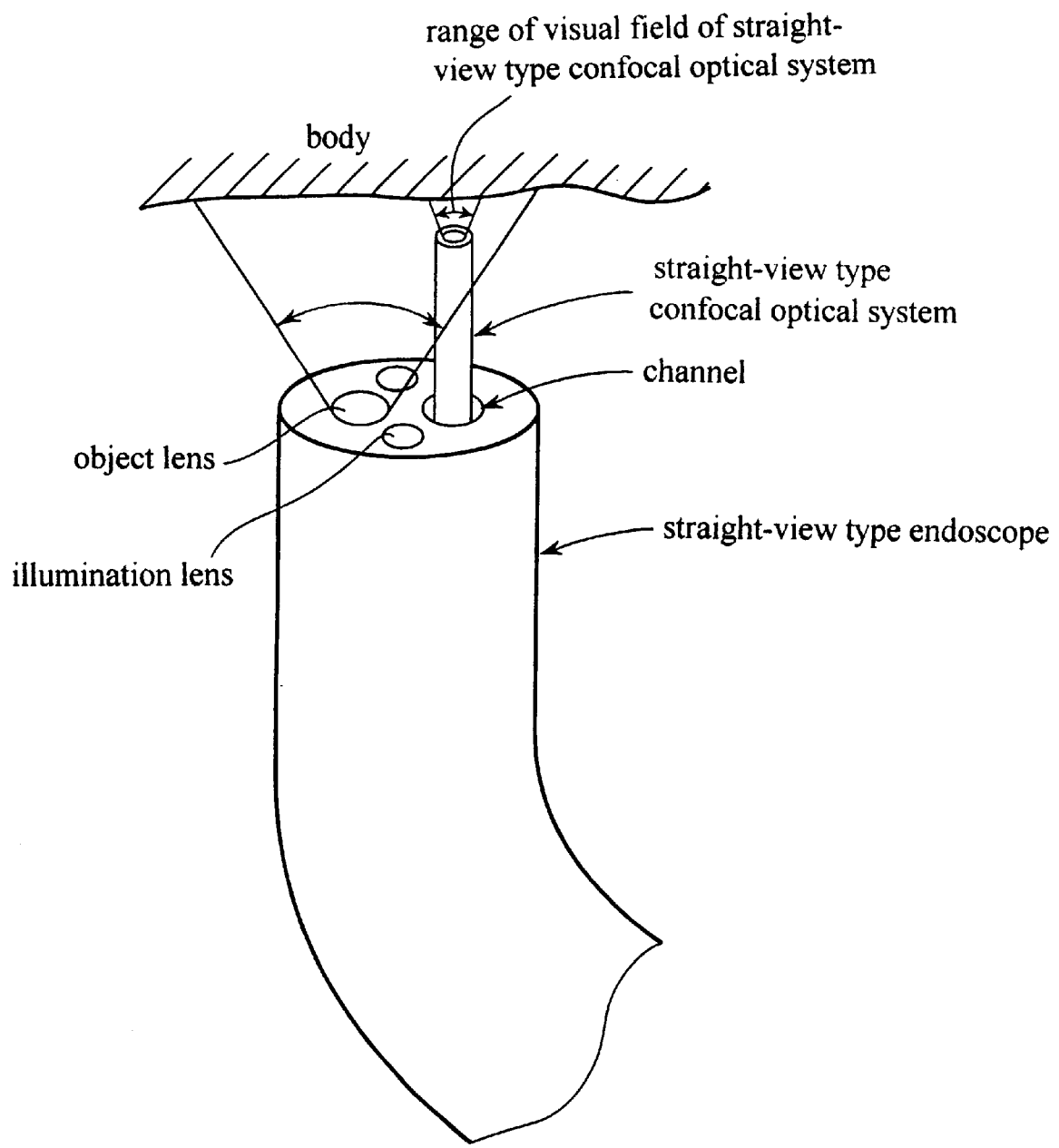
FIG. 7 illustrates a straight-view type confocal optical system being used with a straight-view type endoscope.

Although Embodiment 2 has the "low reflectance region 25" on the scanning mirror 17, a similar effect can be obtained by forming it (i.e., the aperture) on the fixed mirror 16. Furthermore, the mirror 16 can be a scanning mirror and the scanning mirror 17 can be a fixed mirror. Also, the size and position of the aperture may be varied. As in Embodiment 1, planes comprising the low and high reflectance regions 25 and 26, respectively, can be oblique to each other. Also, the optical fiber 15 can have various end face orientations and the fiber itself can be oriented with its length direction as shown in FIGS. 6A–6C (as discussed above for Embodiment 1).

Embodiment 3

Figure 5:
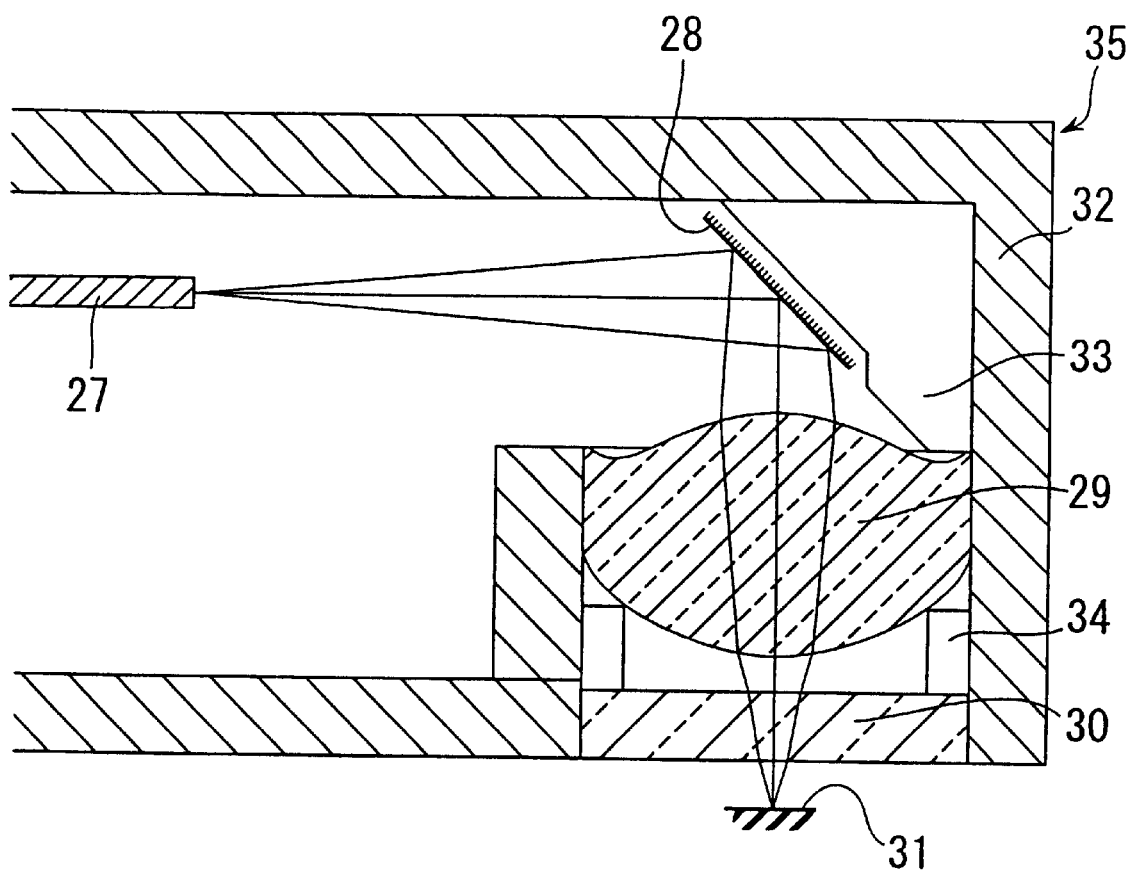
FIG. 5 shows the structure of Embodiment 3 of the present invention.

The structure of Embodiment 3 of the present invention is shown in FIG. 5. Light which emerges from the optical fiber 27 is reflected by scanning mirror 28, converged by lens 29, transmitted through a cover glass 30 and is incident onto an object surface 31. After being reflected by the object surface 31, the light retraces the same path, but in the reverse direction, returning to the optical fiber 27. In Embodiment 3, the scanning mirror 28 can have the same structure as the scanning mirror 17 of Embodiment 2. The low reflectance region 25 (i.e., the aperture in FIG. 4) is used to reduce optical noise arising from unwanted reflections at the surfaces of the lens 29 and cover glass 30.

The optical system of Embodiment 3 has the following construction and dimensions:

the optical path length between the end of the optical fiber 27 and the lens 29 is 2.5 mm;

the center thickness of the lens 29 is 1.001 mm;

the distance between the lens 29 and the cover glass 30 is 0.2 mm;

the thickness of the cover glass 30 is 0.3 mm;

the cover glass 30 is made of BK7 glass;

the lens 29 has a refractive index of 1.81 at the wavelength of the sodium d-line (i.e., 587.56 nm);

the Abbe number of the material of the lens 29 is 37.03; and the outer diameter of the lens 29 is 1.6 mm.

Both surfaces of lens 29 have an aspherical shape, with the equation of the asphere being given by Equation (A) above.

The lens 29 has the following profile. The first surface of lens 29 (i.e., the surface nearest the scanning mirror 28) has the following parameters for Equation (A):

R=0.86041 K=0.000000 A=−0.392370 B=−0.12787 C=−0.974708

D=−0.159410.

The second surface of lens 29 (i.e., the surface nearest the cover glass 30) has the following parameters for Equation. (A):

R=−0.92330 K=0.000000 A=0.834066 B=−0.222425×10$^1$

C=0.387380×10$^1$ D=−0.266492×10$^1$

The optical fiber 27, scanning mirror 28, lens 29, and cover glass 30 form a miniature confocal optical system 35 contained in a microscope body 32 which can be inserted into a channel of an endoscope. FIG. 5 also shows a mirror support 33 for supporting the scanning mirror 28 and a spacing ring 34 for setting the distance between the lens 29 and the cover glass 30.

Embodiment 3 has a side-view structure in which the lengthwise direction (i.e., the direction of insertion) of the miniature confocal optical system 35 and the viewing direction are orthogonal to each other. This embodiment has the low reflectance region 25 at the center of the scanning mirror 28 (i.e., similar to that of Embodiments 1 and 2). This allows optical noise in the side-view type optical system of the present embodiment to be reduced. Compared to a structure in which a shading member such as an aperture ring is inserted within the optical system to reduce optical noise, this embodiment uses fewer parts, which thus facilitates assembling the optical system. As in Embodiments 1 and 2, the size and position of the low re legion 25 may be varied. Also, as in Embodiments 1 and 2, the optical fiber 27 can have any of the end structures or fiber orientations as shown in FIGS. 6A–6C.

The invention being thus described, it will be obvious that the same may be varied in many ways. For example, the "reflective surface region" and the region termed the "region having a relatively lower reflectance factor", may have relative reflectance factor values different than those stated, so long as the "region having a relatively lower reflectance factor" serves to reflect the incident light from the fiber in directions such that light that does not scan the object, but nevertheless returns to the optical fiber, is greatly reduced in intensity as compared to the light from the optical fiber which scans the object and is returned to the optical fiber. All modifications as would be obvious to one skilled in the art are thus intended to be included within the scope of the following claims.

What is claimed is:

1. A confocal optical system comprising:
   a pinhole aperture for creating a point light source from light that is transmitted through an optical fiber;
   an optical scanning system for scanning the light that emerges from the pinhole aperture;
   an optical focusing system for focusing the light from the pinhole aperture, via the optical scanning system, onto or within an object such that the pinhole aperture and the focused light region at the object are at conjugate positions of the confocal optical system;
   at least one of the optical scanning system and the optical focusing system including a reflective surface region and region that has a different reflectivity than the reflective surface region, said region that has a different reflectivity serving to reduce the amount of light that is returned to the optical fiber without having been reflected by the object;
   wherein light emerges from the pinhole aperture and illuminates regions of the object via the optical scanning system and the optical focusing system, and the light reflected by the object is returned to the optical fiber via the optical scanning system and the optical focusing system.

2. The confocal optical system according to claim 1, wherein the optical scanning system includes a fixed mirror and a scanning mirror, both of which have a reflective surface region, and the region that has a different reflectivity is additionally included on the fixed mirror.

3. The confocal optical system according to claim 2, wherein the pinhole aperture is an end face of the core portion of the optical fiber.

4. The confocal optical system according to claim 3, wherein said end face has an oblique orientation with respect to the length direction of the optical fiber at said end face.

5. The confocal optical system according to claim 4, wherein the length direction of the optical fiber at said end face is oriented obliquely to an optical axis of the optical focusing system.

6. The confocal optical system according to claim 2, wherein the region that has a different reflectivity is an aperture that transmits light.

7. The confocal optical system according to claim 2, wherein the reflective surface region and the region that has different reflectivity reflect light along different optical axes.

8. The confocal optical system according to claim 1, wherein the optical scanning system includes a fixed mirror and a scanning mirror, both of which have a reflective surface region, and the region that has a different reflectivity is additionally included on the scanning mirror.

9. The confocal optical system according to claim 8, wherein the pinhole aperture is an end face of the core portion of the optical fiber.

10. The confocal optical system according to claim 9, wherein said end face has an oblique orientation with respect to the length direction of the optical fiber at said end face.

11. The confocal optical system according to claim 10, wherein the length direction of the optical fiber at said end face is oriented obliquely to an optical axis of the optical focusing system.

12. The confocal optical system according to claim 8, wherein the region that has a different reflectivity is an aperture that transmits light.

13. The confocal optical system according to claim 8, wherein the reflective surface region and the region that has a different reflectivity reflect light along different optical axes.

14. The confocal optical system according to claim 8, wherein an optical axis of the light emitted from the pinhole aperture is nearly parallel with an optical axis of the optical focusing system.

15. The confocal optical system according to claim 1, wherein the optical scanning system consists of a scanning mirror which has a reflective surface region and a region that has a different reflectivity.

16. The confocal optical system according to claim 15, wherein the pinhole aperture is an end face of the core portion of the optical fiber.

17. The confocal optical system according to claim 16, wherein said end face has an oblique orientation with respect to the length direction of the optical fiber at said end face.

18. The confocal optical system according to claim 17, wherein the length direction of the optical fiber at said end face is oriented obliquely to an optical axis of the optical focusing system.

19. The confocal optical system according to claim 15, wherein the region that has different reflectivity is an aperture that transmits light.

20. The confocal optical system according to claim 15, wherein the reflective surface region and the region that has a different reflectivity reflect light along different optical axes.

21. The confocal optical system according to claim 15, wherein the optical axis of the light from the pinhole aperture is nearly orthogonal to an optical axis of the optical focusing system.

22. The confocal optical system according to claim 1, wherein the light source emits light of low coherence.

* * * * *

UNITED STATES PATENT AND TRADEMARK OFFICE
CERTIFICATE OF CORRECTION

PATENT NO. : 6,433,910 B2
DATED : August 13, 2002
INVENTOR(S) : Suga

It is certified that error appears in the above-identified patent and that said Letters Patent is hereby corrected as shown below:

Column 2,
Line 50, change "then, reflects" to -- then reflects --;

Column 4,
Line 66, change "in tie case" to -- in the case --;

Column 5,
Line 21, delete the comma after "light";

Column 6,
Line 13, change "trays" to -- rays --;
Line 19, change "embodiment be" to -- embodiment, be --;

Column 7,
Line 4, change "(ice., the" to -- (i.e., the --;
Line 37, change "scattering" to -- scattered --; and Column 8,
Line 50, change "re legion" to -- reflectance region --.

Signed and Sealed this

Fourteenth Day of January, 2003

JAMES E. ROGAN
*Director of the United States Patent and Trademark Office*